United States Patent
Hadden et al.

(10) Patent No.: US 7,684,696 B1
(45) Date of Patent: Mar. 23, 2010

(54) METHOD AND APPARATUS FOR DETERMINING SIGNAL VIABILITY IN OPTICAL NETWORKS

(75) Inventors: Laura Hadden, Kanata (CA); Chee Yoon Lee, Ottawa (CA); Suresh Pillai, Vancouver (CA); Brian Smith, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1299 days.

(21) Appl. No.: 10/624,471

(22) Filed: Jul. 23, 2003

Related U.S. Application Data

(60) Provisional application No. 60/397,622, filed on Jul. 23, 2002.

(51) Int. Cl.
  $H04B\ 10/08$ (2006.01)
  $H04B\ 17/00$ (2006.01)
(52) U.S. Cl. .......................................... 398/25; 398/26
(58) Field of Classification Search .................... 398/25, 398/26, 28, 31, 33, 9, 12, 20, 49, 57
See application file for complete search history.

(56) References Cited

U.S. PATENT DOCUMENTS

| | | | | |
|---|---|---|---|---|
| 4,738,503 A | * | 4/1988 | Desurvire et al. ............. | 385/30 |
| 5,729,372 A | * | 3/1998 | Terahara et al. ............. | 398/182 |
| 6,175,622 B1 | * | 1/2001 | Chiniwala et al. ....... | 379/221.09 |
| 6,317,238 B1 | * | 11/2001 | Bergano et al. ............... | 398/81 |
| 6,701,087 B2 | * | 3/2004 | Beine et al. .................... | 398/38 |
| 6,943,935 B2 | * | 9/2005 | Bickham et al. ............ | 359/334 |
| 6,980,740 B1 | * | 12/2005 | Denkin et al. ................. | 398/38 |
| 7,095,956 B2 | * | 8/2006 | Levandovsky et al. ........ | 398/27 |
| 7,190,902 B2 | * | 3/2007 | Solheim et al. ............... | 398/69 |
| 2002/0131101 A1 | * | 9/2002 | Ohira et al. ................. | 359/110 |
| 2002/0176482 A1 | * | 11/2002 | Chien ......................... | 375/132 |
| 2002/0196507 A1 | * | 12/2002 | Stuart ......................... | 359/179 |
| 2003/0031440 A1 | * | 2/2003 | Dennis et al. ............... | 385/123 |

\* cited by examiner

*Primary Examiner*—Shi K Li

(57) ABSTRACT

It is desirable to provide an improved system for describing the impact of a change in routing on the performance of wavelengths traversing the links in a optical communication network. It is also desirable that such a system be computationally simple. The present invention accomplishes these aims by providing a mechanism for the development of a set of metrics that describe the impact of different fiber types and lengths bearing a number of wavelengths, on one of the wavelengths propagated by a given input power. These metrics permit the prediction of a wavelength's behaviour by simple calculations. Accordingly, the need for full non-linear simulation is obviated, thereby improving the speed, efficiency and flexibility of optical layer routing algorithms.

8 Claims, 3 Drawing Sheets

METHOD AND APPARATUS FOR DETERMINING SIGNAL VIABILITY IN OPTICAL NETWORKS

This application claims the benefit of U.S. Provisional Application No. 60/397,622, filed Jul. 23, 2002.

FIELD OF THE INVENTION

This invention relates to optical networks and, in particular, to a method for determining a signal-path's viability within an optical network.

BACKGROUND OF THE INVENTION

Optical networks are traditionally point-to-point systems in which all electrical to optical conversions occur at a single transmitter site and optical to electrical conversions occur at the same receiver site after a known fixed path. This means that all wavelengths start together, experience the same fiber lengths and types and then enter co-located receivers.

Whenever wavelengths travel through any given path, they will interact with other wavelengths travelling along the same path. There are interference effects generated that must be taken into account at the network design stage in order to ensure satisfactory performance.

In static network configurations, such as are found in traditional point-to-point systems, the interference effects may be calculated a priori using traditional mechanisms.

Optical wavelengths interact due to non-linear effects and noise degradation within optical fibers and optical amplifiers. Currently, in order to determine how degraded a wavelength or signal is when it enters a receiver, simulation tools are used to model the propagation of a wavelength through a path in the presence of other wavelengths.

Such simulations account for the major sources of non-linear degradation by simplifying and solving the non-linear Schrodinger equation:

$$\frac{\partial A}{\partial z} + \beta_1 \frac{\partial A}{\partial t} + \frac{i}{2}\beta_2 \frac{\partial^2 A}{\partial t^2} + \frac{\alpha}{2}A = i\gamma |A|^2 A \quad (1)$$

where A is the pulse amplitude, $\beta_1$ is related to the group velocity of the dominant optical mode carrying the pulse, $\beta_2$ is responsible for pulse broadening, $\gamma$ is the non-linearity coefficient and z is the distance propagated within the fiber. This equation is used to determine the effects of group velocity dispersion and the intensity dependent refractive index only (dispersion and Self Phase Modulation (SPM)). Further levels of abstraction and additional simultaneous propagation equations are required to fully describe the processes which lead to Cross Phase Modulation (XPM) and Four Wave Mixing (FWM). Generally, simulation models are designed incorporating some simplifying assumptions about the parameters of equation (1) and employ other simplified relationships to approximate the effects of XPM and FWM.

The equations developed are then solved numerically for all wavelengths present and over the entire propagation length of fiber. This process is computationally intensive and requires significant processing time. In addition, a high level of user expertise is required to interpret the results.

Further, Cross-Phase Modulation (XPM) and Four Wave Mixing (FWM) effects must also be calculated rigorously from the results.

The current generation of optical communication networks includes Optical Add/Drop Multiplexing (OADM) and Photonic Cross-Connect (PXC) nodes in which wavelengths can branch onto alternate spans of fiber without undergoing optical to electrical conversion. That is a combination of wavelengths that start together do not necessarily have to end up in the same set of co-located receivers. Moreover, individual wavelengths of a set of wavelengths that arrives at a set of co-located receivers may each have traversed a separate path to get to the set of co-located receivers.

OADMs are typically statically configured at system setup to add or drop pre-selected wavelengths. By contrast, PXCs allow incoming wavelengths to be switched dynamically to a choice of output directions.

The introduction of PXCs herald the promise of agile optical networks, in which routing of wavelengths may be dynamically altered to accommodate fluctuations in the demand for services. Accordingly, carrier companies employing agile optical networking techniques may reduce the amount of stranded bandwidth in their existing optical network infrastructures.

Because carrier companies need to use their networks optimally in order to get the most value out of their capacity, such a dynamic ability to optimize network capacity may increase the revenue generated from a fixed amount of fiber capacity. For example, certain wavelengths can be devoted to commercial banking transactions during the weekday and assigned to carry internet traffic in the evening and on weekends. As the flexibility or agility in the optical layer increases, ultimately, carrier companies may be able to offer "capacity on demand", in which wavelengths can be dynamically re-routed to provide capacity where it is needed most at a given time.

However, the introduction of agile optical networks requires a relatively quick assessment method to be made available to the network operator and/or the routing algorithm in order to determine if a possible optical signal path is viable for a desired type of traffic. In other words, prior to switching from a known communications path to an alternate configuration that may improve traffic flow in the network, an algorithm must be in place that will check to ensure that wavelengths moving to a new path will have adequate signal quality to be received when they reach their receiver. If the proposed path introduces unacceptable distortion, an alternative route should be considered.

Alternatively, if technology permits rapid dynamic switching of network paths, a sufficiently responsive viability proving mechanism is required. With such a mechanism, one could conceivably implement a proposed alternate configuration without determining its viability at the time of installation, and dynamically determine the viability of the new signal paths as required.

The traditional mechanisms for ensuring adequate signal performance are unsatisfactory because the non-linear simulations are too complex and too time-consuming to be applied in a dynamic switching environment.

In agile optical network applications, different wavelengths follow different paths through the network from their respective transmitter Tx to their respective receiver Rx. Different groupings of wavelengths will encounter different nodes and segments in their travels. We define a node as a network element such as a transmitter, receiver, static OADM, PXC, and dispersion compensator possibly co-located with one or more optional amplifiers. We define a segment as fiber spans and amplifier sites interconnecting two nodes. Different segments can have different arrangements of fibers, amplifiers, dispersion compensators etc.

Accordingly, if the simulation calculations were to be conducted, they would require a segment by segment analysis, taking into account each wavelength travelling along it. In an agile optical network, a routing change of a single wavelength may invalidate a large proportion of the simulation, which will have to be recalculated.

A number of attempts have been made to overcome the computational intensity required in demonstrating the viability of a proposed alternate routing.

For example, efforts have been made to reduce the complexity of the problem. For instance, special and expensive adjustable dispersion compensators may be introduced to account for different types of fiber.

Alternatively, a worst-case performance threshold may be established for each segment that cannot be exceeded. Typically, the reach of each wavelength path is significantly limited as a result of the imposition of these thresholds, with a consequent requirement of additional regenerative receive/transmit nodes to extend the overall network reach. The addition of such regenerative nodes drives network cost significantly higher.

Similarly, limits may be imposed on the signal power level introduced into each fiber span within a segment. Again, the reach of segment paths is limited as a result.

Another approach is to limit the type of customer traffic that will be accepted on the network. For example, one can reduce the traffic capacity by lowering the bit-rate, which will reduce the complexity of path viability analysis because non-linearities becomes less dominant. At lower bit-rates, systems are predominantly limited by noise effects. Noise analysis can be done very efficiently in comparison with a full distortion and noise simulation. However, this approach greatly reduces the system capacity due to the lower bit-rate, and is generally not a practical alternative. A concrete example is the difference between a 2.5 Gb/s DWDM system and 10 Gb/s DWDM system. The difference in capacity makes 10 Gb/s a much more attractive option, despite the increased complexity.

All of the foregoing are extremely limiting and often expensive approaches that belie the advantages of agile optical networks.

Others have attempted to perform an up-front viability analysis by taking every possible path and conducting extensive simulations to determine the limits of viability of the network during network design. Clearly, such approaches are only suitable for very simple and small networks, and are very easily subject to becoming obsolete. For example, referring to FIG. 1 it can be noted that there are 6 possible paths that need to be simulated. However, the wavelengths sent to each segment might vary as well. Therefore all six paths would need to be simulated with several possible wavelength variations in order to guarantee that the worst-case performance had been assessed and each path was viable. This figure shows only a small example which would only cover a small fraction of a carrier's nationwide network.

SUMMARY OF THE INVENTION

Accordingly, it is desirable to provide an improved system for describing the impact of a change in routing on the performance of wavelengths.

It is also desirable that such a system be computationally simple.

The present invention accomplishes these aims by providing a mechanism for the development of a set of metrics that describe the impact of different fiber types and lengths bearing a number of wavelengths, on one of the wavelengths propagated by a given input power. These metrics permit the prediction of a wavelength's behaviour by simple calculations. Accordingly, the need for full non-linear simulation is obviated, thereby improving the speed, efficiency and flexibility of routing algorithms.

Advantageously, certain optical effects, such as dispersion, self-phase modulation, cross-phase modulation and four-wave mixing, are identified as dominating the overall distortive impact on the signal. Noise effects, such as amplified spontaneous emission, stimulated Brillouin scattering, stimulated Raman scattering and multi-path interference are also identified.

Data tables and/or formulae that approximate the relations governing such effects are identified as functions of fiber type and length, number of wavelengths and input power. The resulting metrics are applied iteratively, from segment to segment, in order to generate an overall figure of merit for a particular network configuration. The figure of merit may be BER, OSNR, Q, or the sum of "penalty points" charged to a segment based on the results of the application of the equations.

If the configuration is altered, either statically or dynamically, downstream segments are re-analyzed. The approximations permit the analysis to be done in a sufficiently compressed time frame that dynamic configuration changes, such as in an agile optical network, may be effected. The analysis may be performed off-line or on-line, remotely at an OAM node or in distributed fashion at each node, provided that the analysis from upstream nodes is passed on, for instance along the OSC channel associated with the fiber segment.

BRIEF DESCRIPTION OF THE DRAWINGS

The embodiments of the present invention will now be described with reference to the following figures, in which identical reference numerals in different figures indicate identical elements and in which.

DETAILED DESCRIPTION OF THE PREFERRED EMBODIMENTS

Figure 1:
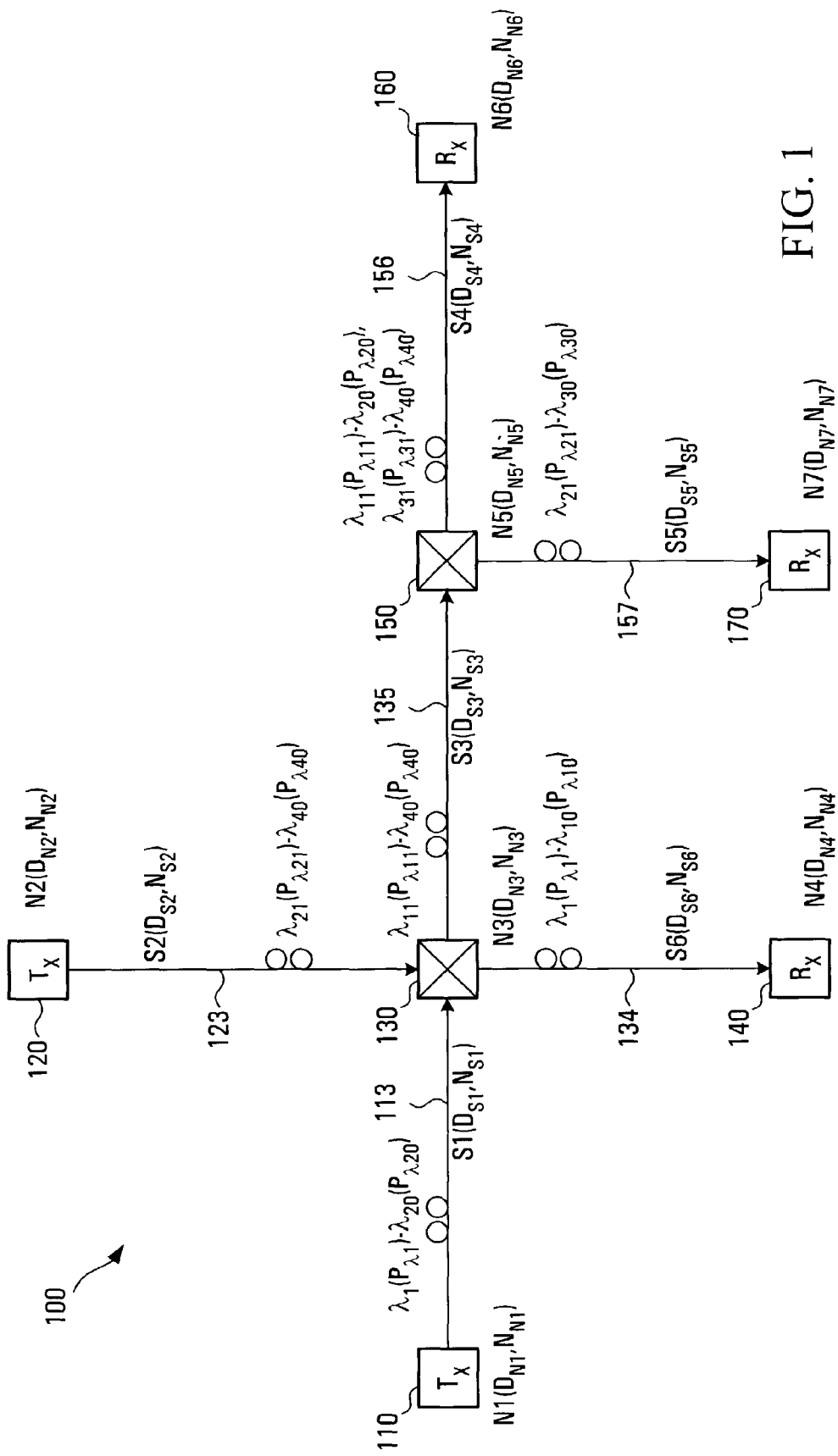
FIG. 1 is a block diagram of a simple optical mesh network of nodes and segments showing a first signal routing topology in accordance with an embodiment of the present invention.

Referring now to FIG. 1, there is shown a simple optical mesh network 100 with nodes 110, 120, 130, 140, 150, 160, 170 interconnected by segments 113, 123, 134, 135, 156, 157, over which a plurality of wavelengths travel.

Those having ordinary skill in this art will readily recognize that such a configuration, including the number, type and distribution of nodes, segments and wavelengths are exemplary only. The actual configuration will depend upon customer requirements and/or network operator specifications. Nevertheless the network 100 is sufficient to illustrate the concepts embodied in the present invention.

Node 110, designated N1 and node 120, designated N2 are transmitters. Node 140, designated N4, node 160 designated N6 and node 170, designated N7 are all receivers. Nodes 130 and 150, designated N3 and N5 respectively, are OADMs allowing static routing of wavelengths. Alternatively, Nodes 130 and 150 could be PXC's that allow for dynamic routing of wavelengths.

Segment 113, designated S1, extends from transmitter N1 to OADM N3. Segment 123, designated S2, extends from transmitter N2 to OADM N3. Segment 134, designated S6, extends from OADM N3 to receiver N4. Segment 135, designated S3, extends from OADM N3 to OADM N5. Segment 156, designated S4, extends from OADM N5 to receiver N6. Segment 157, designated S5, extends from OADM N5 to receiver N7.

The wavelength plan for FIG. 1 shows 40 wavelengths, designated $\lambda 1$-$\lambda 40$ respectively travelling along the network. Wavelengths $\lambda 1$-$\lambda 10$ enter the network 100 through transmitter N1, pass along segment S1 to OADM N3 and are transferred to segment S6, thereafter leaving the network at receiver N4. Wavelengths $\lambda 11$-$\lambda 20$ also enter the network at transmitter N1, pass along segment S1 to OADM N3, but are thereafter routed along segment S3 to OADM N5 and out along segment S4, leaving the network at receiver N6. Wavelengths $\lambda 21$-$\lambda 40$ enter the network at transmitter N2, pass along segment S2 to OADM N3 and are routed along segment S3 to OADM N5. There, wavelengths $\lambda 21$-$\lambda 30$ are routed along segment S5, leaving the network at receiver N7, while wavelengths $\lambda 31$-$\lambda 40$ are routed along segment S4 to receiver N6, where they leave the network.

Those having ordinary skill in this art will recognize that generally, fiber segments and components are considered to be bidirectional. That is, certain wavelength ranges are allocated for signals to be sent from a first node to a second node and other wavelength ranges are allocated for signals to be sent from the second node to the first node along the same segment.

However, the analysis of network configuration is at its essence, unidirectional. Thus, for the purposes of illustration and discussion, each segment is shown to be unidirectional, it being recognized that a second and complementary signal path may indeed be overlaid over the first one shown in FIG. 1, but in the opposite direction, and using different components in the nodes.

Because of the unidirectional nature of the network, it is convenient to refer to nodes from which signals may be received by a reference node and the segments interconnecting them as being upstream in respect thereto. Similarly, nodes to which signals may be sent by a reference node and the segments interconnecting them may be conveniently referred to as being downstream in respect thereto.

It is known that, for certain systems, dispersion, self-phase modulation, cross-phase modulation and four-wave mixing effects dominate the overall signal distortion. Different systems will exhibit different dominant effects.

Dispersion is the spreading of the signal pulse due to the fact that different spectral components of an optical pulse travel at slightly different group velocities.

Self-Phase Modulation (SPM) occurs when a signal modulates a carrier. The intensity changes at the signal bit-rate resulting in a phase change that will either narrow or broaden the optical pulse depending upon the specific fiber's characteristics. If the optical pulse is narrowed, the intensity of the optical pulse increases, resulting in increased non-linearities.

Cross-Phase Modulation (XPM) is similar to self-phase modulation, except that the non-linearities are introduced by the impact of phase changes from one signal in the fiber on another signal in the fiber.

Four-Wave Mixing (FWM) occurs when optical channels interact with one another to transfer some of their power to equally spaced surrounding wavelengths. As a result, there is a distortive effect between signals, made more severe if the signals are closely phase-matched. The effect is similar to inter-modulation distortion in the electrical domain and results in multiple frequency components, some of which will be at other signal wavelengths. Therefore there are new frequency components at integer multiple numbers of wavelength spacing that generate interference effects at the wavelength of interest. This effect increases with increased provisioning power and becomes worse the closer that the zero dispersion wavelength $\lambda_0$ of the fiber is to the wavelength in use. This occurs more frequently in low dispersion fiber.

It is also known that there are a number of noise effects that may be experienced by an optical signal, each of which will degrade the signal performance to one degree or another. These include amplified spontaneous emission, Stimulated Brillouin Scattering, Stimulated Raman Scattering and multipath interference.

Amplified Spontaneous Emission (ASE) is noise generated by the optical amplifiers in a link. ASE is the dominant noise source of optically amplified links.

Stimulated Brillouin Scattering (SBS) occurs when an incident photon produces a phonon of acoustic frequency as well as the scattered photon. This produces an optical frequency shift that varies with the scattering angle. The frequency shift is greater in the backward direction. SBS is only significant above a threshold power level.

Stimulated Raman Scattering (SRS) can severely limit performance by transfer of energy from shorter wavelengths to longer wavelengths.

Multi-path interference (MPI) in an optical link occurs because an optical signal can take more than one path to reach the same place. A delayed version of the original signal can recombine with the original and cause either coherent or incoherent degradation to the original signal.

Experience has shown that the distortive and noisy optical effects that impact how well a wavelength can be received after transmission along a path may be predicted and prioritized based on a number of factors. For example, such factors include but are not limited to the type of fiber, span lengths, the number of wavelengths and the power level input into each span.

In the present embodiment of the invention the four factors given by example in the previous paragraph are identified as base variables. Preferably, the identification of base variables and optical effects will be completed a priori, subject to update as understanding of the optical communications environment increases.

The performance of downstream segments will depend upon the result of upstream segments, since signals (i.e. wavelengths) will have traversed the upstream segments first. Therefore, as a general rule, segments leading from a transmitter node should be analyzed first, as the calculations will not be dependent on the analysis of any upstream segments. In FIG. 1, segments S1 113 and S2 123 fall into this category.

Each wavelength is associated with a matrix of performance metrics $P_\lambda$ to describe its signal quality. Where it is assured that a set of wavelengths will always travel together, the set may be associated with the same matrix of performance metrics $P_\lambda$. The performance metrics $P_\lambda$ generally measure optical signal-to-noise ratio (OSNR) and bit error rate (BER), collectively referred to as a figure of merit Q. Typically, such figures are measured in dB of Q or dBQ.

Alternatively, the performance metrics $P_\lambda$ may maintain a count of "penalty points" accumulated by the signal corresponding to a particular wavelength throughout its journey along the network.

Whatever performance metric is used, signal viability is indicated if, at the receiver end, the wavelength has a performance that exceeds a predetermined acceptable threshold.

The performance metrics $P_\lambda$ may be calculated as a linear sum of the distortion ($D_x$) metrics and noise ($N_x$) metrics (i.e. $D_x+N_x$), that are themselves normalized so that they can be added together. Again, a signal path is considered viable only if $P_\lambda$ exceeds a certain threshold of acceptability. The threshold, in some embodiments, is based on a predetermined BER, receiver input power and OSNR. The threshold can be increased to provide extra margin for risk reduction and for the impact of effects that may not be considered in the calculation of either the distortion metrics or the noise metrics.

For example, if high Polarization-Mode Dispersion (PMD) is known to be present, it may be preferable to set a higher threshold to account for the worst-case PMD. Alternatively, a PMD penalty metric could be subtracted from the sum of the distortion and noise metrics.

Other values that may be included in the calculation of the performance metrics are factors that take into account ageing and degradation due to temperature and/or ambient conditions, modulation instability, and the possible presence of polarization dependent loss in fibers or other components. Such factors are analysed statistically over time and may be included as an increase in the performance threshold or a decrease in the calculated OSNR, whichever is in the best interest of simplifying computations.

In accordance with the present invention, each segment is associated with a set of distortion $D_x$ and noise $N_x$ metrics that describe the segment's impact on a wavelength travelling along the segment in a particular direction. Each of these metrics seeks to approximate the distortive and noisy effect, respectively, that will be experienced by an optical signal along a segment.

For example, each metric will be a function of the four base variables identified above (e.g. the fiber type A, the span length profile B, the number of wavelengths C and the input power D). With reference to FIG. 1, segment S1 will be associated with metrics $D_{S1}$ and $N_{S1}$.

$D_{S1}$ comprises a matrix of data or functions, each corresponding to one of the distortive effects, such as dispersion (DISP~), SPM~, XPM~ and FWM~. The "~" indicates that each of these metrics is merely an approximation of the actual non-linear relation. Thus, the distortion metric $D_x$ may generally be expressed as follows:

$$D_x = [DISP_x^\sim(A, B, C, D), \quad (2)$$
$$SPM_x^\sim(A, B, C, D),$$
$$XPM_x^\sim(A, B, C, D),$$
$$FWM_x^\sim(A, B, C, D,)]$$

Similarly, $N_{S1}$ comprises a matrix of data or functions, each corresponding to one of the noise effects, such as ASE~, SBS~, SRS~ and MPI~. Thus, the noise metric $N_x$ may generally be expressed as follows:

$$N_x = [ASE_x^\sim(A, B, C, D), \quad (3)$$
$$SBS_x^\sim(A, B, C, D),$$
$$SRS_x^\sim(A, B, C, D),$$
$$MPI_x^\sim(A, B, C, D,)]$$

It will be appreciated by those having ordinary skill in this art that the distortion effects and the noise effects are not limited to the types enumerated above. Other distortive and/or noise effects may be identified or considered significant and may be added to the corresponding distortion or noise metric, in addition to or in place of the other effects.

Nevertheless, for the purpose of the present embodiment, relations for each of these approximations are synthesized from the generalization of system performance. The metrics may be in the form of functions or matrices of data points and are derived using a combination of simulation, laboratory analysis, and data sheet specification of nodes and fibers. Sufficient analysis information is required to describe the statistical worst-case performance for general systems of the given configuration.

In accordance with the present embodiment of the invention, the distortion metric $D_x$ is parameterized using the format in Equation (2). One method of performing the distortion analysis is to set the net residual dispersion profile at every amplifier site following each span to be constant. A dispersion compensation device will be placed after each span that compensates for the dispersion of the span. The result is that $DISP_x$ is a known value at all points on the path, which in turn simplifies the calculations.

SPM is primarily dependent on fiber type and input power per wavelength. Given the fiber type A, span length profile B and input power D, the distortive effects of dispersion and SPM on a per span basis can be estimated using a database of simulation and/or laboratory analysis data for systems of similar fiber type sorted by launch power. The estimations are further simplified if all of the fibers in an optical system are the same.

XPM and FWM have dependencies on the number of wavelengths C. Thus, the distortive effects of XPM and FWM are estimated on a per span per wavelength count basis. The distortion metric $D_x$ is then determined as a function of the data matrices or functions estimated for DISP~, SPM~, XPM~ and FWM~. The impact of each distortion effect (i.e. DISP~, SPM~, XPM~ and FWM~) may be looked up in units of distortion penalty or Q. The summation can then be translated into an OSNR degradation distortion metric $D_x$.

The noise analysis of an optical path or segment can be parameterized by assuming that the signal degradation due to noise is predominantly dependent on the number of amplifiers present in an optical path or segment.

The OSNR contribution per amplifier site can be determined using data collected from laboratory testing or a full noise simulation of the specific amplifier type in the network. A set of data for equal span loss segments of varying span counts is gathered showing OSNR obtained from the laboratory and/or simulation with respect to the span count (for each possible amplifier type). This data should have a wide enough range to encompass the minimum and maximum number of spans present in any segment in the network, as well as the minimum and maximum loss per span that is permitted within the network. The OSNR for intermediate span counts and span losses are then be interpolated from the data. Table 1.0 provided below shows an example of such data.

TABLE 1.0

OSNR values sort by Amplifier Type

| Span Count | Amplifier Type | Span Loss [dB/span] | OSNR [dB] |
|---|---|---|---|
| 1 | A | Min = 17 | w |
| 1 | A | Median = 21 | x |
| 1 | A | Max = 25 | y |
| 1 | B | Min = 17 | z |

TABLE 1.0-continued

OSNR values sort by Amplifier Type

| Span Count | Amplifier Type | Span Loss [dB/span] | OSNR [dB] |
|---|---|---|---|
| 1 | B | Median = 20 | ... |
| ... | ... | ... | ... |
| Mid = 6 | A | Min = 17 | ... |
| ... | ... | ... | ... |
| Max = 12 | B | Max = 20 | ... |

The OSNR contribution of the amplifier site after span x of loss y would then be a function of the OSNR data extrapolated for an x span system, divided by the number of amplifier sites (x+1). The summation of the OSNR contributions for each amplifier in the segment would give the noise performance of the segment.

The accuracy of this method requires certain conditions to be met within a network. The first of these conditions is that the allowable span loss range must be restricted so that all span losses fall within the range of the OSNR data being used for interpolation. Having a restricted range of span losses also ensures that the input power to the amplifier at the end of each span is approximately equal, and that every amplifier is therefore operating with a known gain shape (preferably at the point where gain is flat across the channel spectrum). In addition it must be possible to control the launch power into each span so that all wavelengths are within an acceptable small variation from the optimum per channel power. These two requirements can be met by various methods including careful amplifier site placement or use of fixed pads to adjust the span losses. Appropriate design of the amplifier gain profile, amplifier and transmitter power control software algorithms, and devices such as gain flattening filters can be vital to ensure that the channel power profile remains as flat and predictable as possible.

Each node will have an impact on the signal quality as well. Transmitters and receivers translate signals between the electrical and optical domains and vice versa, and have known signal quality degradation characteristics that are well understood in the art. For instance, both transmitters and receivers can be modelled as transfer functions which encompass typical characteristics like bit-rate, bit pattern, rise time and fall time, chirp, receiver amplitude ripple and bandwidth, and the receiver phase response. These characteristics will impact the signal quality, and must be included in the viability analysis. In some instances, such characteristics may be safely ignored for the purposes of viability analysis because they are insignificant, or because they do not alter the analysis, given that they occur at the extremities of the optical path.

One can also approximate the impact on the signal quality of other nodes, such as OADMs and PXCs, by a three-step process. First, the operation of the node is modelled as a plurality of lossless (in the electrical domain) transmitters and receivers, choosing such devices as most nearly resemble the architecture of the node under discussion. The signal quality degradation is then measured. This virtual receive/transmit site allows for the measurement of signal quality degradation prior to the path end point.

Second, because such nodes remain at heart optical components, distortion $D_x$ and noise $N_x$ metrics are identified and applied for the node corresponding to each signal path generated by the node.

Third, with these metrics the signal quality of each of the wavelengths exiting each segment may then be calculated. If every wavelength is found to be viable, then the path is viable and the reconfiguration or switch can be made.

With reference to FIG. 1, as an example, consider the path viability analysis for wavelengths $\lambda 1$-$\lambda 5$ travelling from N1 to N3 to N4. First, the signal degradation due to N1 is measured and assigned distortion and noise metrics $D_{N1}$ and $N_{N1}$, respectively. Then, a distortion metric for S1, Ds, is determined using Equation (2) and a noise metric for S1, $N_{S1}$, is determined using Equation (3). Similarly, distortion and noise metrics $D_{N3}$, $N_{N3}$ and $D_{S6}$, $N_{S6}$ are determined for N3 and segment S6, respectively. Finally, the distortion and noise metrics $D_{N4}$, $N_{N4}$ for N4 are determined. The relationship between the performance metrics $P_{\lambda 1}$ to $P_{\lambda 5}$ and the distortion and noise metrics can be expressed as follows:

$$P_{\lambda x} = (D_{S1}+D_{S2})+(N_{S1}+N_{S2})+(D_{N1}+D_{N2}+D_{N4}+N_{N1}+N_{N2}+N_{N4}), \text{ where } x=1 \text{ to } 5$$

The term $(D_{S1}+D_{S2})$ is OSNR degradation due to distortion, thus it will have a negative value. The term $(N_{S1}+N_{S2})$ is the OSNR available through segments S1 and S2. The term $(D_{N1}+D_{N2}+D_{N4})$ is the combination of filter penalties, thus it too will have a negative value; and, $(N_{N1}+N_{N2}+N_{N4})$ is the combination of the noise penalties having a negative value and threshold as allocated margin.

If each of the performance metrics $P_{\lambda 1}$ to $P_{\lambda 5}$ is found to be above a respective pre-determined threshold, then signal path for wavelengths $\lambda 1$ to $\lambda 5$ is deemed viable.

Figure 2:
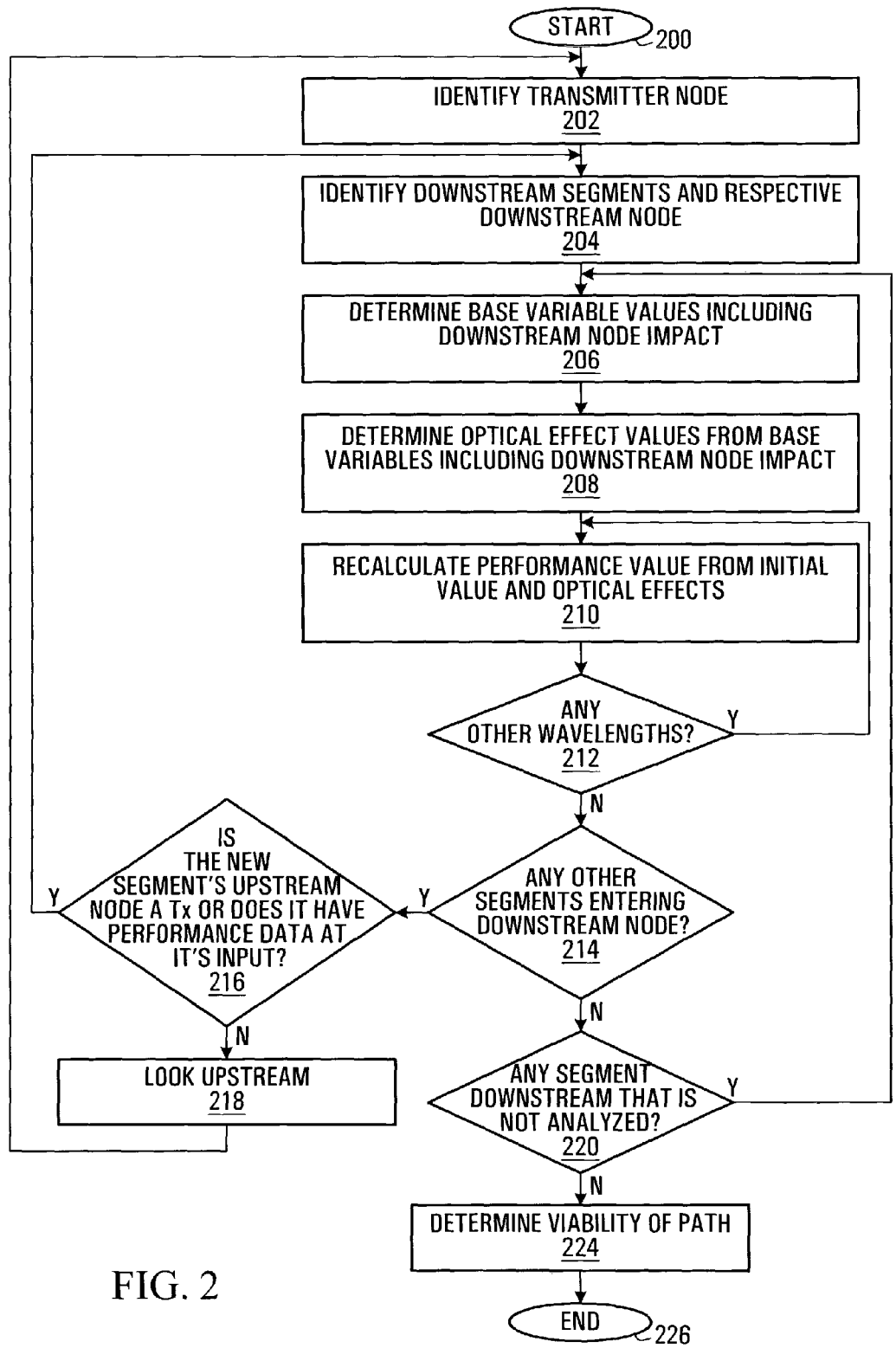
FIG. 2 is a flow chart showing the steps involved in determining a signal-path's viability in the network of FIG. 1.

Turning now to FIG. 2, there is shown an exemplary flow chart showing steps that may be followed in implementing the present invention. The steps for implementing the present invention take into account the various distortion $D_x$ and noise $N_x$ metrics, as well as other models used to approximate the degradation experienced by wavelengths in an optical path that have been discussed thus far.

To begin in step 200 an alternative wavelength distribution (i.e. signal path) is selected for evaluation of its viability. Step 202 indicates that a transmitter node is identified first. The method depicted in FIG. 2 is recursive so step 202 will be repeated so that all transmitter nodes in the optical network are identified. This is discussed in detailed further below. At step 204, for the transmitter node identified in step 202, a downstream segment and respective downstream node are identified to which the transmitter node transmits signals. It is to be understood that each downstream segment terminates at a node, where the node may be a PXC, OADM or an actual receiver. Again, because the method depicted in FIG. 2 is recursive, step 204 will be repeated so that all downstream segments and nodes of the transmitter identified in step 202 are also identified.

For the downstream segment and node identified in step 204, the values of associated base variables (discussed above) will be determined in step 206. Then using the associated base variable values, the optical effects will be quantified into optical effect values in step 208 for the downstream segment and node. As indicated in steps 206 and 208, it is understood that if the downstream node contributes a significant optical effect, such impact is taken into account. For example, there may be distortion from the filters of an OADM.

The optical effect values so determined result in a change in the performance for each wavelength traversing the downstream segment and possibly the respective downstream node. Accordingly, at steps 210 and 212, for each wavelength entering the downstream node (identified at step 204) the performance is re-calculated.

At step 214 it is determined whether or not there are any other segments entering the downstream node identified at step 204. If there is another segment (yes path, step 214) entering the downstream node, the method proceeds to step 216. On the other hand, if there is not another segment (no path, step 214), then the method proceeds to step 220.

At step 216 it is determined whether or not the new segment's upstream node is a transmitter not yet identified. If the new segment originates directly from a transmitter (yes path, step 216), then the method proceeds to step 204 so that that transmitter's downstream segments are all identified and analysed in accordance with steps 204 to 220. On the other hand, if the new segment does not originate directly from a transmitter (no path, step 216) the method proceeds to step 218 and then to step 202 in which the originating transmitter is identified by looking upstream. It should be noted that if the new segment does not originate directly from a transmitter then in accordance with the present embodiment of the invention it should have performance metrics (data) associated with it, as indicated in FIG. 2.

At step 220 it is determined whether or not all of the downstream segments originating from the transmitter identified at step 202 have been analysed. If there are downstream segments that have not been analysed (yes path, step 220) then steps 206 to 214 are repeated for the un-analysed downstream segments one at a time. Alternatively, if all of the downstream segments have been analysed (no path, step 220), then the method proceed to step 224. At step 224 the signal-path viability (i.e. viability of the alternative wavelength distribution) is determined.

Generally, once all transmitter nodes and their downstream segments are analyzed, other nodes and their downstream segments will be identified as being calculable, even though such nodes are not transmitter nodes, because the analysis of all segments entering the node from which the segment in question originates has been completed.

For example, in FIG. 1, segments S3 135 and S6 134 would become calculable upon completion of the analysis of segments S1 113 and S2 123, because node N3 130 has no input segments that have not been analysed.

It should be recognized that the node from which the segment originates may impact the quantification of one or more of the base variables or even one of the identified optical effects, as earlier discussed.

Following the completion of the analysis of some of these segments, other segments will become calculable. For example, in FIG. 1, upon the completion of the analysis of segment S3 135, segments S4 156 and S5 157 will become calculable.

Eventually, all of the segments will have been calculated. Generally, those segments that terminate at a receiver will have been calculated last. In respect of such segments, a further calculation of the impact of the terminating receiver on the wavelengths received will be required (not shown).

A proposed signal path will be considered viable if a performance metric $P_\lambda$ for a wavelength associated with the signal at the receiver end is satisfactory.

The foregoing method of determining the viability of a signal considerably shortens the analysis time required. Whereas the analysis of the network shown in FIG. 1 with 6 paths and 40 wavelengths would take one to two working days and an expert technician using rigorous simulation methods, the same network would only require minutes to calculate using an automation of the approximation metrics and functions discussed herein.

The method depicted in the flow chart of FIG. 2 is suitable for testing the viability of all signal paths in a network. It is anticipated that whenever a change to the network configuration is contemplated, such an all-encompassing viability analysis will be undertaken, especially since the time and expense required to do so is minimal in comparison to the traditional non-linear simulation method.

It should, however, be recognized that a limited viability analysis for a single signal path may also be undertaken. In such an event, only those nodes and paths that share segments with the signal path under consideration need be subjected to analysis.

Figure 3:
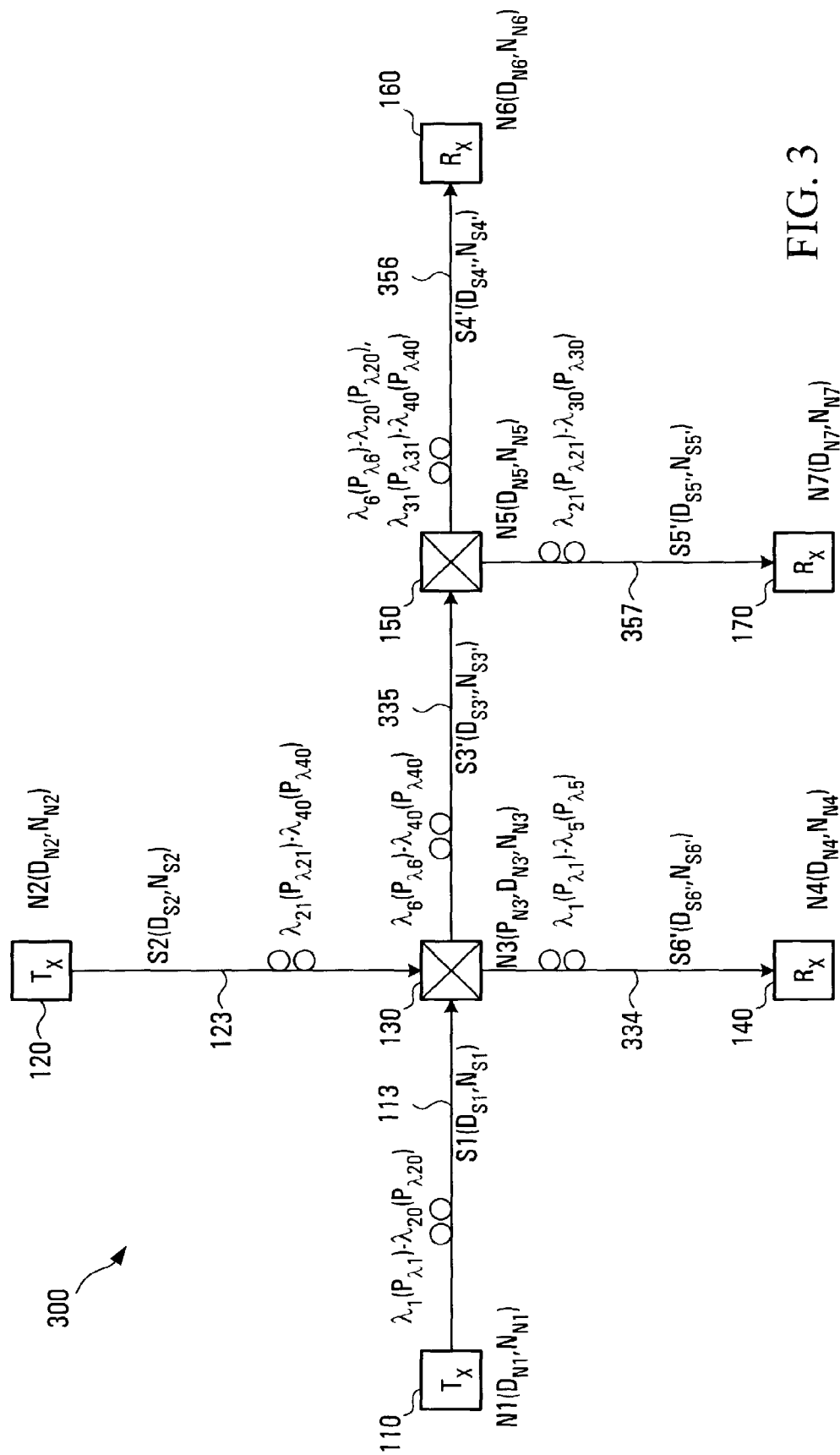
FIG. 3 is a block diagram of the optical mesh network of FIG. 1 but showing an alternate signal routing topology.

Turning now to FIG. 3, the same physical configuration of nodes and interconnecting segments is shown. However, the OADM at node N3 has been statically reprogrammed to reroute wavelengths λ6-λ10 along segment S3 (designated S3' for reasons that will be discussed below) 335 to node N5 rather than along segment S6 (designated S6') 334 to node N4. In practical application, this can occur as a branch is added to a network, for instance, during a network upgrade.

It will be recognized that if N3 was a PXC, the re-routing could have taken place dynamically, in response to a routing software instruction.

Similarly, node N5 may or may not have needed to be reprogrammed, depending upon its physical architecture and configuration, in order to permit wavelengths λ6-λ10 to proceed along segment S4 (designated S4') 356 to node N6.

In so doing, a new analysis for the network shown, now designated generally at 300, must be calculated. It will be appreciated that the results for segments S1 113 and S2 123 will be the same for network 300 as it was for network 100. However, for segments S3' 335 and segments S6' 334, new analysis will need to be undertaken, because of the different set of wavelengths travelling along each segment.

Once this analysis has been completed, segment S4' 356, being dependent upon the results of the analysis of segment S3' 335, may also be analyzed.

It will be observed that while segment S5' 357 in FIG. 2 bears the same wavelengths, namely λ21-λ30 as does S5 157 in FIG. 1, the analysis of its associated metrics $D_{S5'}$ and $N_{S5'}$ will be different. This is because they depend upon the analysis of the metrics for segment S3' 335, which will differ from the metrics for segment S3 135. Thus, for this reason, the segment has been redesignated S5'.

It will be apparent that the analysis may be conducted on an off-line basis in a location remote from the network and prior to issuing any routing instructions.

Alternatively, the analysis may be performed on-line, at a central location (not shown) dedicated to OAM (Operations, Administration and Maintenance) functions, based on information as to the present topology of the network in order to confirm the viability of the implemented network topology.

Still further, the analysis may be easily and automatically generated at each individual node as the routing commands are given. In order to do so, some mechanism would have to be provided to forward along each segment an indication of the performance metrics received at a previous node, as for example, along an optical service channel (OSC) wavelength in each segment.

The present invention can be implemented in digital electronic circuitry, or in computer hardware, firmware, software, or in combination thereof. Apparatus of the invention can be implemented in a computer program product tangibly embodied in a machine-readable storage device for execution by a programmable processor; and methods actions can be performed by a programmable processor executing a program of instructions to perform functions of the invention by operating on input data and generating output. The invention can be implemented advantageously in one or more computer programs that are executable on a programmable system including at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in ASICs (application-specific integrated circuits).

Examples of such types of computers are programmable processing systems contained in the nodes N1-N7 shown in the figures, or as indicated above, in a remote OAM node (not shown), suitable for implementing or performing the apparatus or methods of the invention. The system may comprise a processor, a random access memory, a hard drive controller, and an input/output controller coupled by a processor bus.

It will be apparent to those skilled in this art that various modifications and variations may be made to the embodiments disclosed herein, consistent with the present invention, without departing from the spirit and scope of the present invention.

For example, multiple other effects, such as modulation instability, polarization mode dispersion, polarization dependent loss, DSCM effects and dynamic gain flattening filter effects, and devices could be approximated. Further the viability analysis tools and the mechanism for developing them disclosed herein may be applied to optimize the performance of the network at the design stage, or to make adjustments to periodicals of transmitters, amplifiers and compensators within the network.

It should be apparent that the common goal of embodiments of the invention is that they should each predict, as accurately as possible, the performance impact of a change in wavelength allocation throughout an optical network. In alternative embodiments of the invention the use of measured performance data could advantageously be used to provide increases in accuracy provided that the measurement instruments are sufficiently precise. Current measurements, of say OSNR or Q, could be used when a calculation takes into account a performance metric from a previous section that is already in place. As described above, in relation to method disclosed in FIG. 2, such a section would be used for determining performance for the following sections.

For example, with reference to FIG. 1, subtracting the calculated noise impact of segment S3 from the OSNR at N3 will provide a more accurate assessment of the OSNR at N5. Wavelengths $\lambda1$-$\lambda20$ enter N3 after travelling through segment S1. At N3, the performance metrics associated with the wavelengths $\lambda1$-$\lambda20$ could be calculated using only received power, span length, span loss and fiber type. However, if OSNR measurements were also available at N3 they too could be used. Including measurements of the OSNR provides an increase in the accuracy of the prediction, since the calculated OSNR and the measured OSNR could be compared and the system adjusted until there is relative agreement between the two values.

In addition, with further reference to the proposed change in wavelength allocation shown in FIG. 3, it is shown that the wavelengths assigned to segment S6 is reduced from 10 (in FIG. 1) to 5. This reduction in capacity should improve the performance experienced on the remaining wavelengths. A measurement of the OSNR or Q taken at N4 before the switch will give an indication of the viability of the path for those 5 remaining wavelengths whose path is not changing.

Prior to the switch (FIG. 1), segment S3 is assigned wavelengths $\lambda11$-$\lambda40$. Thus, wavelengths $\lambda11$-$\lambda20$ are received at N5, which in turn would indicate that a measurement of the network (or System) Q and/or OSNR is likely available. After the switch (FIG. 3), the segment S3 contains wavelengths $\lambda6$-$\lambda40$ in which wavelengths $\lambda6$-$\lambda10$ are new to S3. Since both sets of wavelengths $\lambda11$-$\lambda20$ and $\lambda6$-$\lambda10$ travel the same path to N3, the performance of the wavelengths $\lambda11$-$\lambda20$ before the switch will provide a reasonable accurate indication of the performance of wavelengths $\lambda6$-$\lambda10$ at N5 after the switch.

It should be noted that the exact OSNR or Q measured at N3 before and after the switch may change. A change in the OSNR or Q will occur because power control algorithms may adjust transmit power at N1, or amplifier setting on segment S1, in order to optimize wavelength performance given the change in wavelength allocation that has occurred. However, it should also be noted that knowledge of the power control algorithms could be used in order to predict any power changes leading to OSNR improvements of degradations.

The invention claimed is:

1. A method for determining the viability of a signal path of a wavelength through a communication network, comprising:
    defining a performance matrix by identifying at least one performance metric describing the signal quality of the wavelength along the signal path;
    identifying a unidirectional path of the wavelength through a plurality of nodes interconnected by segments of optic fibre;
    calculating an initial value of the performance matrix by analyzing interference effects on the wavelength;
    for each of the plurality of nodes along the unidirectional path,
        identifying a downstream segment on the unidirectional path, and recalculating a value of the performance matrix by analyzing interference effects on the wavelength in the downstream segment, and analyzing interference effects on the wavelength at the node; and
        for each segment entering the downstream node connected to the downstream segment on the wavelength other than the downstream segment on the unidirectional path, recalculating the value of the performance matrix by identifying a transmitter node of the segment entering the downstream node on the wavelength, and analyzing interference effects on the wavelength while the signal passes through the transmitter node to the segment entering the downstream node;
    at a receiver node, comparing the value of the performance matrix against an acceptable threshold to determine the viability of the signal path;
    wherein analyzing interference effects on the wavelength comprises identifying at least one optical effect that impacts the viability of the signal path, identifying at least one dominant source contributing to each identified optical effect, and identifying at least one base variable upon which each identified dominant source depends, wherein the at least one identified base variable is one or more of the fibre type, the length of the segment, the number of wavelength, the length for each fibre span within the segment, the power level input into each span.

2. The method according to claim 1 wherein the at least one identified optical effect is a distortion effect.

3. The method according to claim 2 wherein the at least one identified dominant source is one or more of dispersion, self-phase modulation, cross-phase modulation, four-wave mixing.

4. The method according to claim 1 where the at least one identified optical effect is a noise effect.

5. The method according to claim 4 wherein the at least one identified dominant source is one or more of amplified spontaneous emission, stimulated Brillouin scattering, stimulated Raman scattering, multi-path interference.

6. The method according to claim 1 wherein the at least one performance metric is measured by one or more of bit error rate, optical signal-to-noise ratio, Q, penalty points.

7. A computer-readable medium having computer-executable instructions stored thereon which, when executed by a processor in a node in a communications network comprising a plurality of nodes interconnected by segments of optical fibre, cause the node to:

receive from an upstream node along a wavelength path a value of a performance matrix that identifies at least one performance metric describing the signal quality of a wavelength along a signal path;

determine the value of the performance matrix by analyzing interference effects on the wavelength in each of downstream segments on the wavelength and analyzing interference effects on the wavelength at the node, for each segment entering the downstream node connected to the downstream segment on the wavelength other than the downstream segment on the unidirectional path, identifying a transmitter node of the segment entering the downstream node on the wavelength, and analyzing interference effects on the wavelength while the signal passes through the transmitter node to the segment entering the downstream node;

determine if the resulting value of the performance matrix satisfies an acceptable threshold to determine the viability of the signal path;

wherein analyzing interference effects on the wavelength comprising the steps of identifying at least one optical effect that impacts the viability of the signal path, identifying at least one dominant source contributing to each identified optical effect, and identifying at least one base variable upon which each identified dominant source depends, wherein the at least one identified base variable is one or more of the fibre type, the length of the segment, the number of wavelength, the length for each fibre span within the segment, the power level input into each span.

8. A computer-readable medium having computer-executable instructions stored thereon which, when executed by a processor in an intermediate node in a communications network, interconnected with at least one upstream node by an upstream segment from along which it is adapted to receive signals and with at least one downstream node by a downstream segment along which it is adapted to send signals, cause the intermediate node to:

receive from a upstream node along a wavelength path a value of a performance matrix that identifies at least one performance metric describing the signal quality of a wavelength along a signal path;

calculate the value of the performance matrix by analyzing interference effects on the wavelength in each of downstream segments on the wavelength and analyzing interference effects on the wavelength at the node, for each segment entering the downstream node connected to the downstream segment on the wavelength other than the downstream segment on the unidirectional path, identifying a transmitter node of the segment entering the downstream node on the wavelength, and analyzing interference effects on the wavelength while the signal passes through the transmitter node to the segment entering the downstream node;

communicate the resulting performance matrix along the at least one downstream segment to the corresponding downstream node;

wherein analyzing interference effects on the wavelength comprising the steps of identifying at least one optical effect that impacts the viability of the signal path, identifying at least one dominant source contributing to each identified optical effect, and identifying at least one base variable upon which each identified dominant source depends, wherein the at least one identified base variable is one or more of the fibre type, the length of the segment, the number of wavelength, the length for each fibre span within the segment, the power level input into each span.

* * * * *